(12) United States Patent
Kitamura et al.

(10) Patent No.: US 9,945,250 B2
(45) Date of Patent: Apr. 17, 2018

(54) AIRCRAFT GAS TURBINE (75) Inventors: Tsuyoshi Kitamura, Minato-ku (JP); Shinichiro Masaki, Minato-ku (JP)

(73) Assignee: MITSUBISHI HEAVY INDUSTRIES AERO ENGINES, LTD., Aichi (JP)

(*) Notice: Subject to any disclaimer, the term of this patent is extended or adjusted under 35 U.S.C. 154(b) by 723 days.

(21) Appl. No.: 13/515,978

(22) PCT Filed: Jan. 17, 2011

(86) PCT No.: PCT/JP2011/050662
§ 371 (c)(1),
(2), (4) Date: Jun. 14, 2012

(87) PCT Pub. No.: WO2011/105132
PCT Pub. Date: Sep. 1, 2011

(65) Prior Publication Data
US 2012/0247121 A1 Oct. 4, 2012

(30) Foreign Application Priority Data
Feb. 24, 2010 (JP) .................................. 2010-039413

(51) Int. Cl.
*F01D 11/24* (2006.01)
*F01D 25/14* (2006.01)
(Continued)

(52) U.S. Cl.
CPC .............. *F01D 25/14* (2013.01); *F01D 11/24* (2013.01); *F02C 7/18* (2013.01);
(Continued)

(58) Field of Classification Search
CPC .......... F01D 11/24; F01D 25/14; F01D 11/10; F01D 25/12; F01D 11/08; F02C 7/18;
(Continued)

(56) References Cited

U.S. PATENT DOCUMENTS 3,583,824 A * 6/1971 Smuland et al. ............. 415/117
3,742,705 A * 7/1973 Sifford ........................... 60/806
(Continued)

FOREIGN PATENT DOCUMENTS

CN 101368513 A 2/2009
CN 100549530 C 10/2009
(Continued)

OTHER PUBLICATIONS

Notification of the First Office Action dated Jan. 21, 2014 in corresponding Chinese Application No. 201180005184.5 (with English translation).
(Continued)

*Primary Examiner* — Lorne Meade
*Assistant Examiner* — Eric Linderman
(74) *Attorney, Agent, or Firm* — Wenderoth, Lind & Ponack, L.L.P.

(57) ABSTRACT

An aircraft gas turbine is constituted by accommodating a compressor (14), a combustor (15), and a turbine (16) in a cylindrical main unit casing (12). A thick wall part (52) is provided on an outer periphery side of rotor blades (34) in the main unit casing. A cooling passage (53), for cooling the thick wall part (52) by circulating compressed air compressed by the compressor, is provided in the thick wall part. Also provided is a discharge passage (55) for discharging compressed air having circulated in the cooling passage to a combustion gas passage A. The structural strength of the thick wall part is ensured by appropriately cooling the thick wall part of the casing, while simplifying the structure and preventing a decrease in efficiency, thereby ensuring effective containment performance and an appropriate clearance between the casing and the rotor blades.

2 Claims, 3 Drawing Sheets (51) Int. Cl.
  *F02C 7/18* (2006.01)
  *F01D 25/12* (2006.01)
  *F01D 11/08* (2006.01)
(52) U.S. Cl.
  CPC .... *F05D 2220/323* (2013.01); *F05D 2240/11* (2013.01); *F05D 2250/185* (2013.01); *F05D 2260/205* (2013.01); *Y02T 50/675* (2013.01); *Y02T 50/676* (2013.01)
(58) Field of Classification Search
  CPC ........... F05D 2240/11; F05D 2260/205; F05D 2250/185; Y02T 50/675
  USPC ........... 60/796–798; 415/108, 115–117, 134, 415/137–139, 175–178
  See application file for complete search history.

(56) References Cited

U.S. PATENT DOCUMENTS

| | | | | |
|---|---|---|---|---|
| 4,318,666 | A * | 3/1982 | Pask | F01D 11/12 415/116 |
| 4,419,044 | A * | 12/1983 | Barry et al. | 415/117 |
| 4,497,610 | A * | 2/1985 | Richardson et al. | 415/116 |
| 4,526,226 | A * | 7/1985 | Hsia | F01D 5/187 165/109.1 |
| 4,573,865 | A * | 3/1986 | Hsia et al. | 415/115 |
| 4,967,552 | A * | 11/1990 | Kumata et al. | 60/806 |
| 5,048,288 | A * | 9/1991 | Bessette | F01D 11/24 415/116 |
| 5,098,257 | A * | 3/1992 | Hultgren | F01D 5/18 415/115 |
| 5,169,287 | A * | 12/1992 | Proctor | F01D 5/182 415/115 |
| 5,267,831 | A * | 12/1993 | Damiral | 415/114 |
| 5,375,973 | A * | 12/1994 | Sloop | F01D 11/08 415/115 |
| 5,486,090 | A * | 1/1996 | Thompson | F01D 11/08 415/173.1 |
| 5,538,393 | A * | 7/1996 | Thompson | F01D 25/12 415/115 |
| 5,779,436 | A | 7/1998 | Glezer et al. | |
| 5,993,150 | A * | 11/1999 | Liotta | F01D 11/10 415/115 |
| 6,099,244 | A * | 8/2000 | Tomita et al. | 415/115 |
| 6,116,852 | A | 9/2000 | Pierre et al. | |
| 6,126,389 | A * | 10/2000 | Burdgick | 415/115 |
| 6,217,279 | B1 * | 4/2001 | Ai et al. | 415/110 |
| 6,905,302 | B2 * | 6/2005 | Lee | F01D 5/288 415/115 |
| 7,033,138 | B2 * | 4/2006 | Tomita et al. | 415/139 |
| 7,246,993 | B2 * | 7/2007 | Bolms et al. | 415/116 |
| 7,299,618 | B2 | 11/2007 | Terazaki et al. | |
| 7,549,282 | B2 * | 6/2009 | Widenhoefer et al. | 60/39.17 |
| 8,061,979 | B1 * | 11/2011 | Liang | F01D 11/08 415/173.1 |
| 8,127,551 | B2 | 3/2012 | Commaret et al. | |
| 8,727,704 | B2 * | 5/2014 | Lee | F01D 11/08 415/116 |
| 9,062,561 | B2 * | 6/2015 | Tibbott | B60G 21/055 |
| 9,822,654 | B2 * | 11/2017 | Brandl | F01D 9/065 |
| 2004/0090013 | A1 * | 5/2004 | Lawer | F01D 11/08 277/412 |
| 2004/0120803 | A1 * | 6/2004 | Lucas | F01D 9/04 415/116 |
| 2004/0146399 | A1 * | 7/2004 | Bolms | F01D 25/12 415/175 |
| 2005/0058534 | A1 * | 3/2005 | Lee | F01D 5/288 415/116 |
| 2005/0166599 | A1 | 8/2005 | Terazaki et al. | |
| 2005/0238480 | A1 * | 10/2005 | Phipps | F01D 25/14 415/115 |
| 2006/0042266 | A1 | 3/2006 | Albers et al. | |
| 2006/0115356 | A1 * | 6/2006 | Balsdon | F01D 11/24 415/178 |
| 2007/0025841 | A1 * | 2/2007 | Milazar | 415/134 |
| 2007/0041827 | A1 * | 2/2007 | Camus | F01D 9/04 415/116 |
| 2008/0112797 | A1 | 5/2008 | Seitzer et al. | |
| 2008/0187435 | A1 * | 8/2008 | Farah et al. | 415/115 |
| 2008/0298975 | A1 * | 12/2008 | James | B23P 15/04 416/229 A |
| 2009/0319150 | A1 | 12/2009 | Plunkett et al. | |
| 2010/0031663 | A1 | 2/2010 | Commaret et al. | |
| 2010/0183428 | A1 * | 7/2010 | Liang | F01D 5/187 415/115 |
| 2010/0288376 | A1 * | 11/2010 | Haasz | F01D 9/065 137/468 |
| 2011/0255989 | A1 * | 10/2011 | Koyabu | F01D 11/24 416/97 R |
| 2012/0057968 | A1 * | 3/2012 | Lee | F01D 11/08 415/178 |
| 2014/0230403 | A1 * | 8/2014 | Merry et al. | 60/226.1 |
| 2015/0110612 | A1 * | 4/2015 | Brandl | F01D 9/065 415/178 |
| 2015/0240721 | A1 * | 8/2015 | Campomanes | F02C 7/18 415/116 |
| 2016/0251962 | A1 * | 9/2016 | Hashimoto | F02C 7/18 |
| 2017/0362999 | A1 * | 12/2017 | Abe | F02C 7/04 |

FOREIGN PATENT DOCUMENTS

| | | |
|---|---|---|
| DE | 197 34 216 | 2/1998 |
| EP | 0231952 A2 | 8/1987 |
| EP | 1566524 A2 | 8/2005 |
| EP | 1 630 385 | 3/2006 |
| JP | 53-17814 | 2/1978 |
| JP | 54-123609 | 9/1979 |
| JP | 62-182444 | 8/1987 |
| JP | 1-123609 | 5/1989 |
| JP | 6-159099 | 6/1994 |
| JP | 9-53462 | 2/1997 |
| JP | 10-8911 | 1/1998 |
| JP | 3187992 | 7/2001 |
| JP | 2001-526347 | 12/2001 |
| JP | 2005-226653 | 8/2005 |
| JP | 2006-63982 | 3/2006 |
| JP | 2008-121685 | 5/2008 |
| JP | 2010-1890 | 1/2010 |

OTHER PUBLICATIONS

Notice of Allowance dated Jul. 30, 2014 in corresponding Canadian Application No. 2,784,315.
International Search Report dated Mar. 29, 2011 in corresponding International Application No. PCT/JP2011/050662.
Written Opinion of the International Searching Authority dated Mar. 29, 2011 in corresponding International Application No. PCT/JP2011/050662 (with English translation).
English translation of Office Action dated Oct. 29, 2013 in corresponding Japanese Application No. 2010-039413.
Notification of the Decision to Grant dated Sep. 2, 2015 in corresponding Chinese patent application No. 201180005184.5 (with English translation).
Notice of Allowance dated Jul. 7, 2015 in corresponding Japanese application No. 2010-039413 (with partial English translation).
Extended European Search Report dated Nov. 22, 2017 in corresponding European Application No. 11747096.3.

* cited by examiner

AIRCRAFT GAS TURBINE

BACKGROUND OF THE INVENTION

1. Technical Field

The present invention relates to an aircraft gas turbine constituted by accommodating a compressor, a combustor, and a turbine in a casing.

2. Description of the Related Art

A gas turbine has been used as an engine for an aircraft such as a helicopter and a jet aircraft. This aircraft gas turbine is constituted by a compressor, a combustor, and a turbine, in which air taken in from an air inlet is compressed by the compressor to become high-temperature and high-pressure compressed air, a fuel is supplied to the compressed air and burned in the combustor, and the turbine is driven by the high-temperature and high-pressure combustion gas. In the case of a helicopter, a rotor is rotated by a driving force of the turbine, and in a case of a jet aircraft, a thrust force is gained by energy of flue gas.

The turbine constituting the aircraft gas turbine is configured such that a plurality of nozzles and rotor blades are arranged alternately in a casing, and a rotational driving force is gained by driving the rotor blades by combustion gas, thereby driving the compressor. In this type of turbine, when the rotor blades are damaged by any cause, the damaged member may scatter to outside due to a centrifugal force and thus the casing may be damaged. Therefore, the casing has a containment structure in which a thick wall part is provided for additional strength on an outer periphery side of the rotor blades.

However, at the time of operating the aircraft gas turbine, the temperature of the casing becomes high, and thus the structural strength of the thick wall part decreases, and the functions of the containment structure may not be fulfilled. Furthermore, a temperature difference is generated between the thick wall part and a thin wall part both having a thermal capacity different from each other, and a thermal stress is generated because of the temperature difference. Particularly, at the time of startup or shutdown of the aircraft gas turbine, a large thermal stress is generated due to a rapid temperature change, and an amount of a thermal deformation caused by the change increases. Consequently, it becomes difficult to maintain an appropriate clearance between ends of the rotor blades and an inner surface of the casing, thereby decreasing the efficiency of the aircraft gas turbine.

For example, to solve such problems, there is a technique described in Japanese Patent Application Laid-open No. H10-008911. In a double-hull turbine casing described in JP 10-008911, a double hull forming a hollow annular chamber is provided in a turbine casing that surrounds rotor blades of a gas turbine, so that cooling air flows in the chamber in a circumferential direction surrounding the rotor blades of the turbine, thereby cooling the casing. There is also provided a gap control device that controls gaps between rotor blades by adjusting a flow volume of cooling air.

SUMMARY OF THE INVENTION

1. Technical Problem

In the conventional double-hull turbine casing described above, cooling air is supplied into a double-hull chamber by the gap control device so as to cool the casing, and gaps between the rotor blades are controlled. In this case, in the conventional technique, there is no description as to what air is used as the cooling air, and as to where the cooling air supplied to the chamber is discharged. As described in the conventional technique in JP 10-008911, when ventilation air guided from a fan is used as cooling air, an introduction path and a pump or the like for introducing the ventilation air are required, and therefore the structure is complicated. In addition, when bleed air from the compressor is used as the cooling air, the amount of combustion gas is reduced, thereby decreasing the efficiency of the structure.

The present invention has been achieved to solve the above problems, and an object of the present invention is to provide an aircraft gas turbine that can improve the structural strength thereof by appropriately cooling a thick wall part of a casing, while simplifying the structure and preventing a decrease in efficiency, thereby achieving a more effective containment structure, and that can suppress a thermal deformation due to a thermal stress and ensure an appropriate clearance between rotor blades and the casing.

2. Solution to the Problem

According to an aspect of the present invention, an aircraft gas turbine including a compressor, a combustor, and a turbine in a casing having a cylindrical shape, includes: a thick wall part provided on an outer periphery side of a rotor blade in the casing; a cooling passage provided in the thick wall part to circulate compressed air compressed by the compressor to cool the thick wall part; and a discharge passage for discharging compressed air having circulated in the cooling passage to a combustion gas passage.

Therefore, because compressed air compressed by the compressor circulates in the cooling passage, the thick wall part of the casing is appropriately cooled to improve the structural strength, and a containment structure functions more effectively. Furthermore, a thermal stress and a thermal deformation caused by a temperature difference between the thick wall part and a thin wall part both having a thermal capacity different from each other are suppressed, thereby ensuring an appropriate clearance between the casing and ends of the rotor blades. Further, because compressed air having circulated in the cooling passage is discharged to the combustion gas passage through the discharge passage, compressed air serving as a cooling medium is returned to the combustion gas passage, thereby enabling to prevent a decrease in efficiency. Further, by using compressed air as the cooling medium, a pump or the like does not need to be provided separately, thereby simplifying the structure.

Advantageously, in the aircraft gas turbine, one end of the cooling passage is open to a suction part of compressed air in the combustor.

Therefore, only the cooling passage, one end of which is open to the suction part of compressed air in the combustor, needs to be provided in the thick wall part of the casing, and a pump, another passage or the like does not need to be provided separately, thereby enabling to further simplify the structure.

Advantageously, in the aircraft gas turbine, the casing has a main unit casing and a shroud positioned inside of the main unit casing, the discharge passage is provided between the main unit casing and the shroud, the other end of the cooling passage is open to the discharge passage, and the discharge passage is in communication with the combustion gas passage via an opening provided in the shroud.

Therefore, the cooling passage, the other end of which is open to the discharge passage, is provided in the thick wall part of the casing, and an opening needs to be provided only in the shroud to discharge compressed air having circulated in the cooling passage to the combustion gas passage, and a pump or the like does not need to be provided separately, thereby simplifying the structure. Furthermore, by cooling the thick wall part, the structural strength increases to demonstrate an effective containment effect, and a thermal deformation amount or a thermal displacement amount of the casing and the shroud can be suppressed, thereby ensuring an appropriate clearance between the shroud and the ends of the rotor blades.

Advantageously, in the aircraft gas turbine, the discharge passage discharges compressed air having circulated in the cooling passage to an upstream side of a nozzle in the combustion gas passage.

Therefore, compressed air discharged from the discharge passage is returned to the upstream side of the nozzles and is rectified by the nozzles. Therefore, the turbine can increase its workload by the returned compressed air, thereby preventing a decrease in efficiency.

Advantageously, in the aircraft gas turbine, the cooling passage is provided in the thick wall part of the casing along an axis direction of a turbine rotor, and is arranged in plural in a circumferential direction at an equal interval.

Therefore, because the cooling passages are arranged in the circumferential direction at an equal interval in the thick wall part of the casing, the thick wall part can be uniformly cooled in the circumferential direction, and the temperature distribution in the circumferential direction of the casing is equalized, thereby suppressing thermal deformation.

Advantageously, in the aircraft gas turbine, the cooling passage is formed in a serpentine shape.

Therefore, compressed air flows in the cooling passage formed in a serpentine shape, and the cooling efficiency can be improved by enlarging a contact area of the compressed air in the thick wall part. Furthermore, by forming the cooling passage in a serpentine shape, it is possible to suppress an increase in pressure loss and a flow volume of cooling air becomes excessive, thereby reducing the amount of cooling air.

Advantageously, in the aircraft gas turbine, the cooling passage includes a cavity provided in the thick wall part of the casing, a plurality of inlet passages for causing compressed air to flow into the cavity, and a plurality of outlet passages for causing compressed air in the cavity to flow out to the discharge passage.

Therefore, compressed air is temporarily accumulated in the cavity, and the cooling efficiency can be improved by enlarging a contact area of the compressed air in the thick wall part. By causing the cavity to function as a radiation shield, heat transfer to an external wall of the casing can be suppressed.

3. Advantageous Effects of the Invention

According to the aircraft gas turbine of the present invention, a cooling passage for circulating compressed air compressed by a compressor to effect cooling is provided in a thick wall part provided on an outer periphery of rotor blades in a casing. A discharge passage for discharging compressed air having circulated in the cooling passage to a combustion gas passage is also provided. Accordingly, the thick wall part of the casing is appropriately cooled, while simplifying the structure and preventing a decrease in efficiency, thereby ensuring an appropriate clearance between the rotor blades and the casing.

DETAILED DESCRIPTION OF THE INVENTION

Exemplary embodiments of an aircraft gas turbine according to the present invention will be explained below in detail with reference to the accompanying drawings. The present invention is not limited to the embodiments.

First Embodiment

Figure 1:
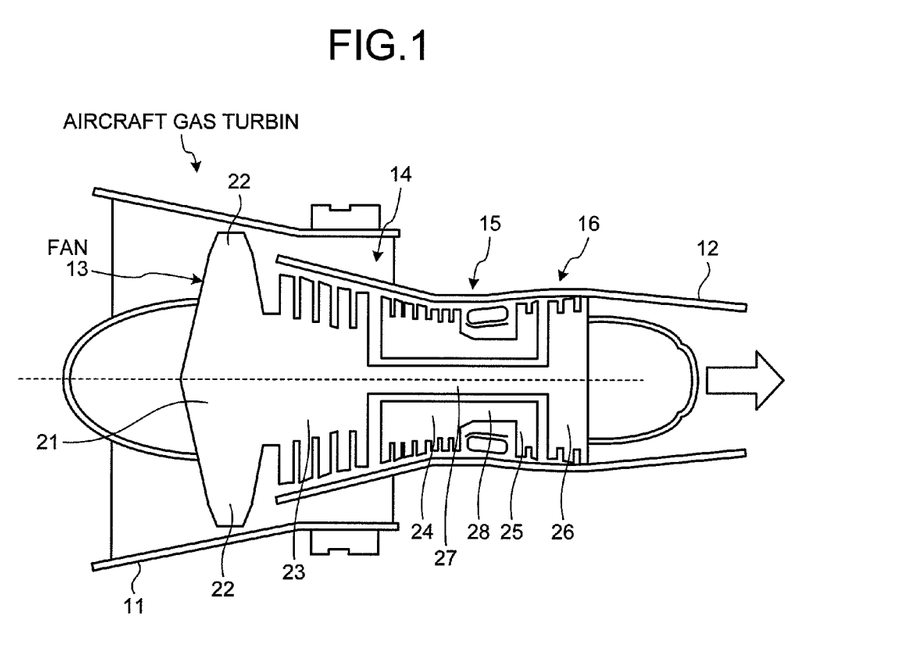
FIG. 1 is a schematic configuration diagram of an aircraft gas turbine according to a first embodiment of the present invention.
Figure 2:
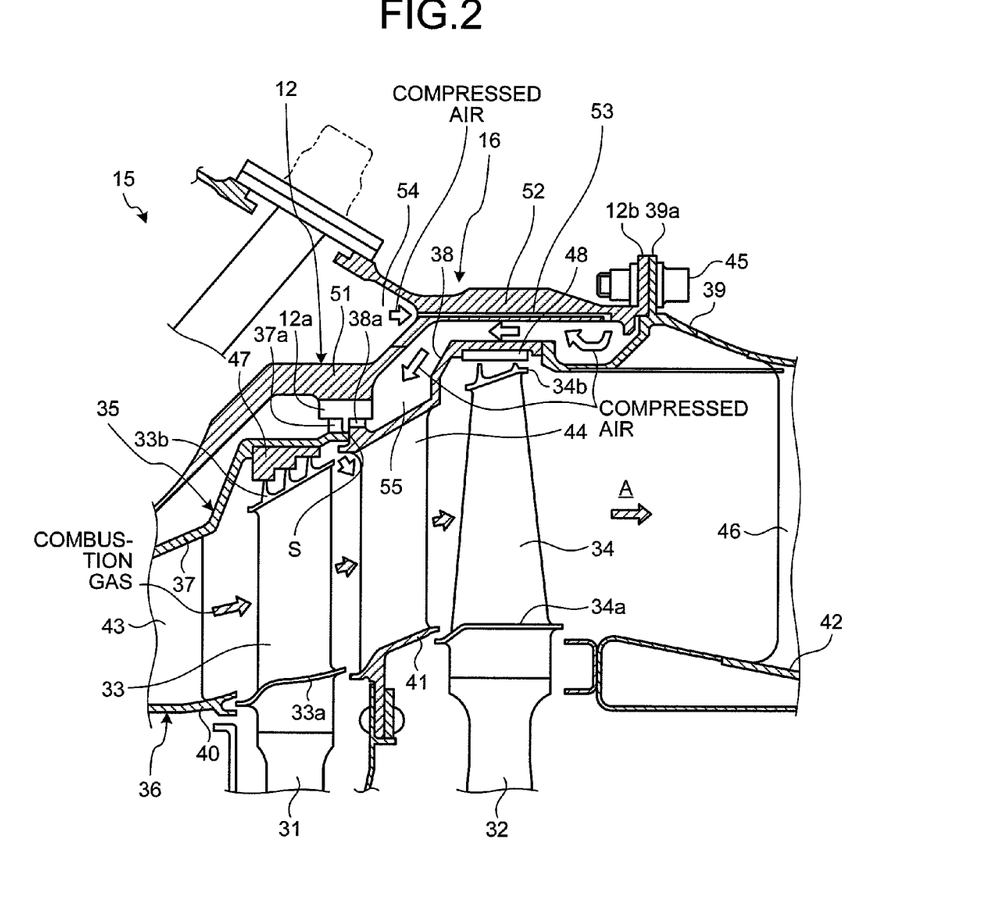
FIG. 2 is a schematic diagram of relevant parts of a turbine in the aircraft gas turbine of the first embodiment.
Figure 3:
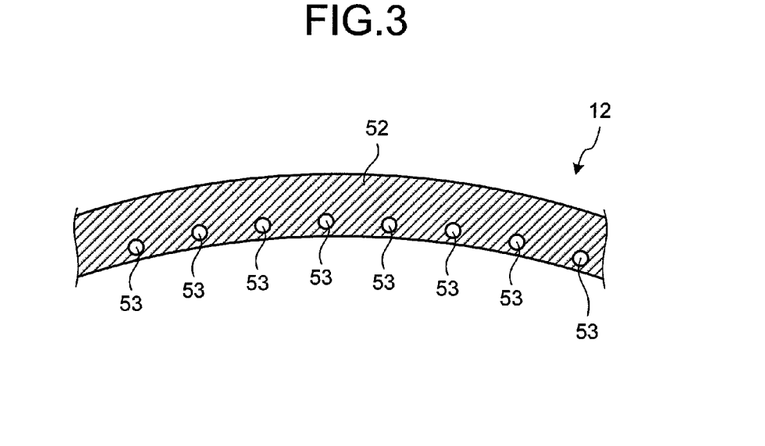
FIG. 3 is a cross-sectional view of relevant parts of a thick wall part of a casing in the aircraft gas turbine of the first embodiment.

FIG. 1 is a schematic configuration diagram of an aircraft gas turbine according to a first embodiment of the present invention, FIG. 2 is a schematic diagram of relevant parts of a turbine in the aircraft gas turbine of the first embodiment, and FIG. 3 is a cross-sectional view of relevant parts of a thick wall part of a casing in the aircraft gas turbine of the first embodiment.

The aircraft gas turbine according to the first embodiment includes, as shown in FIG. 1, a fan casing 11 and a main unit casing 12, where a fan 13 is accommodated in the fan casing 11, and a compressor 14, a combustor 15, and a turbine 16 are accommodated in the main unit casing 12.

The fan 13 is constituted by mounting a plurality of fan blades 22 on an outer periphery of a rotation shaft 21. The compressor 14 includes a low-pressure compressor 23 and a high-pressure compressor 24. The combustor 15 is positioned on a downstream side of the compressor 14, and is arranged in plural in a circumferential direction. The turbine 16 is positioned on a downstream side of the combustor 15, and includes a high-pressure turbine 25 and a low-pressure turbine 26. The rotation shaft 21 of the fan 13 and the low-pressure compressor 23 are coupled together, and the low-pressure compressor 23 and the low-pressure turbine 26 are coupled together by a first rotor shaft 27. The high-pressure compressor 24 and the high-pressure turbine 25 are coupled together by a cylindrical second rotor shaft 28 positioned on an outer periphery of the first rotor shaft 27.

Accordingly, in the compressor 14, air taken in from an air inlet passes through a plurality of nozzles and rotor blades (not shown) in the low-pressure compressor 23 and the high-pressure compressor 24 and is compressed to become high-temperature and high-pressure compressed air. A predetermined fuel is supplied to compressed air and is burned in the combustor 15. High-temperature and high pressure combustion gas, which is a working fluid generated by the combustor 15, passes through the nozzles and rotor blades (not shown) in the high-pressure turbine 25 and the low-pressure turbine 26 constituting the turbine 16 to rotate the turbine. In this case, a rotative force of the low-pressure turbine 26 is transmitted to the low-pressure compressor 23 by the first rotor shaft 27 to drive the low-pressure compressor 23. Furthermore, a rotative force of the high-pressure turbine 25 is transmitted to the high-pressure compressor 24 by the second rotor shaft 28 to drive the high-pressure compressor 24. As a result, the fan 13 can be driven and the thrust force can be gained by flue gas discharged from the turbine 16.

In the low-pressure turbine 26 of the turbine 16, as shown in FIGS. 2 and 3, two turbine disks 31 and 32 are fixed on the outer periphery of the rotor shaft 27 (see FIG. 1) side by side in an axial direction. The turbine disks 31 and 32 have a disk-like shape, and are arranged with a predetermined gap therebetween in the axial direction. A plurality of rotor blades 33 and 34 are fitted to the outer periphery thereof with a predetermined gap therebetween in a circumferential direction.

The main unit casing 12 is formed in a cylindrical shape, and has a larger diameter toward a downstream side in a flow direction of combustion gas. An external shroud 35 is arranged inside of the main unit casing 12 with a predetermined gap therebetween, and an internal shroud 36 is arranged inside of the external shroud 35 with a predetermined gap therebetween. The external shroud 35 is formed by coupling three ring-shaped external shroud bodies 37, 38, and 39 together in the axial direction, and is formed in a cylindrical shape. The internal shroud 36 is formed by arranging three ring-shaped internal shroud bodies 40, 41, and 42 with a predetermined gap therebetween in the axial direction, and is formed in a substantially cylindrical shape.

A plurality of nozzles 43 are positioned on an upstream side of the rotor blade 33 and fitted between the external shroud body 37 and the internal shroud body 40 with a predetermined gap therebetween in the circumferential direction. A plurality of nozzles 44 are also positioned on a downstream side of the rotor blade 33 and on an upstream side of the rotor blade 34 and fitted between the external shroud body 38 and the internal shroud body 41 with a predetermined gap therebetween in the circumferential direction. In the external shroud bodies 37 and 38, the respective opposing ends abut on each other with a predetermined gap (an opening) S and protrusions 37a and 38a are supported by a supporting portion 12a formed on an inner periphery of the main unit casing 12. In the external shroud body 39, a flange 39a formed on an outer periphery thereof is overlapped on a flange 12b of the main unit casing 12, and the flanges are coupled together by a fastening bolt 45. A rear end of the external shroud body 39 and a front end of the internal shroud body 42 are coupled together by a plurality of coupling members 46.

In the rotor blade 33, a platform 33a is provided continuous to the internal shroud bodies 40 and 41 at a base end, and a chip shroud 33b is provided at a tip side. A predetermined clearance (a gap) is ensured between the chip shroud 33b and the external shroud body 37 having a back plate 47. Similarly, in the rotor blade 34, a platform 34a is provided continuous to the internal shroud bodies 41 and 42 at a base end, and a chip shroud 34b is provided at a tip side. A predetermined clearance (a gap) is ensured between the chip shroud 34b and the external shroud body 38 having a back plate 48. The respective chip shrouds 33b and 34b are mounted on all the rotor blades 33 and 34 to form a ring-shaped shroud. The back plates 47 and 48 may not be provided according to need.

Therefore, a toroidal combustion gas passage A surrounded by the external shroud 35, the internal shroud 36, the platforms 33a and 34a, and the chip shrouds 33b and 34b is constituted, and the rotor blades 33 and 34 and the nozzles 43 and 44 are arranged in the combustion gas passage A.

In the first embodiment, the fan casing 11, the main unit casing 12, and the external shroud 35 function as a casing of the present invention.

In the aircraft gas turbine constituted in this manner, when the rotor blades 33 and 34 rotating around the rotor shafts (turbine rotors) 27 and 28 (see FIG. 1) are broken by a certain cause, pieces of the broken rotor blades 33 and 34 scatter to the outside by a centrifugal force, and the external shroud 35 and the main unit casing 12 may be damaged. Therefore, by providing thick wall parts 51 and 52 corresponding to the outer peripheries of the respective rotor blades 33 and 34, the main unit casing 12 has a containment structure with this part being reinforced.

A plurality of cooling passages 53 that cool the thick wall part 52 by circulating compressed air compressed by the compressor 14 (see FIG. 1) are provided in one thick wall part 52. The cooling passages 53 are provided along an axis direction of the rotor shafts (turbine rotors) 27 and 28 (see FIG. 1), and are arranged in the circumferential direction of the main unit casing 12 at an equal interval. One end of each of the cooling passages 53 is open to a suction part 54 of compressed air in the combustor 15 (see FIG. 1). The respective cooling passages 53 can be prepared by casting, electrochemical machining, or machining by a drill. The respective cooling passages 53 do not need to be provided at an equal interval in the circumferential direction.

An empty space along a longitudinal direction is provided between the main unit casing 12 and the external shroud 35, and the space functions as a discharge passage 55 for discharging compressed air circulated in the cooling passages 53 to the combustion gas passage A. The other end of each of the cooling passages 53 is open to a rear end of the discharge passage 55. The discharge passage 55 is in communication with an opening provided in the external shroud 35, that is, with the combustion gas passage A via a gap S between the external shroud bodies 37 and 38. In the present embodiment, the gap S is provided on an upstream side of the nozzle (the last nozzle) 44 in the combustion gas passage A, and compressed air in the discharge passage 55 is discharged to the upstream side of the nozzle 44 in the combustion gas passage A.

In the aircraft gas turbine constituted in this manner, because the main unit casing 12 becomes a high temperature at the time of operating, the structural strength of the thick wall parts 51 and 52 decreases. At the time of operating with a rapid load change such as at the time of startup or shutdown, a thermal stress is generated due to a temperature difference between the thick wall parts 51 and 52 and other parts of the main unit casing 12, which are thin wall parts other than the thick wall parts 51 and 52, and thermal deformation amounts thereof are different. That is, the thick wall parts 51 and 52 of the main unit casing 12 have a larger thermal capacity than the thin wall part (other parts) of the main unit casing 12, and thus a temperature difference is generated between the other parts and the thick wall parts, thereby generating a large thermal stress due to the temperature difference, and increasing the deformation amount. Accordingly, the deformation amount of the external shroud 35 integrally formed with the main unit casing 12 becomes large. Therefore, it becomes difficult to maintain a clearance between the tips of the rotor blades 34 (the chip shrouds 34b)

and the external shroud 35 in an appropriate amount, and the clearance increases to decrease the efficiency of the aircraft gas turbine.

However, in the present embodiment, the cooling passages 53 are provided in the thick wall part 52 of the main unit casing 12. Therefore, when compressed air compressed by the compressor 14 is supplied to the suction part 54 in the combustor 15 as combustion air or cooling air, the compressed air flows in from the one end of each of the cooling passages 53 open to the suction part 54. The thick wall part 52 is cooled by the compressed air flowing into the respective cooling passages 53. In this case, compressed air in the suction part 54 flows into the respective cooling passages 53 as a natural convection current due to a pressure difference between the suction part 54 and the discharge passages 55. Therefore, the structural strength of the thick wall part 52 of the main unit casing 12 is improved, and the containment structure functions efficiently. The temperature difference between the thick wall parts and the thin wall part other than the thick wall parts 51 and 52 in the main unit casing 12 having a relatively small thermal capacity is reduced by cooling the thick wall part 52 having a relatively large thermal capacity. Accordingly, the thermal stress and the thermal deformation amount of the main unit casing 12 are suppressed, and the clearance between the tips of the rotor blades 34 (the chip shrouds 34b) and the external shroud 35 arranged inside of the main unit casing 12, with the deformation amount thereof being suppressed, can be maintained in an appropriate amount.

Thereafter, compressed air having cooled the thick wall part 52 by being circulated in the respective cooling passages 53 is discharged to the discharge passage 55, turns around and flows toward the upstream side in the turbine 16 in the discharge passage 55, while cooling the external shroud 35 (the external shroud body 38), and flows into the combustion gas passage A through the gap S between the external shroud bodies 37 and 38. In this case, compressed air in the discharge passage 55 passes through the gap S and flows into the combustion gas passage A as the natural convection current due to the pressure difference between the discharge passage 55 and the combustion gas passage A. Therefore, by returning compressed air bled immediately before the combustor 15 to the combustion gas passage A, a decrease in the workload of the turbine 16 can be suppressed.

As described above, in the aircraft gas turbine according to the first embodiment, the compressor 14, the combustor 15, and the turbine 16 are accommodated in the cylindrical main unit casing 12, the thick wall part 52 is provided on the outer periphery side of the rotor blades 34 in the main unit casing 12, the cooling passages 53 for cooling the thick wall part 52 by circulating compressed air compressed by the compressor 14 is provided in the thick wall part 52, and the discharge passage 55 for discharging combustion gas circulated in the cooling passages 53 to the combustion gas passage A is provided.

Accordingly, by circulating compressed air compressed by the compressor 14 in the respective cooling passages 53, the thick wall part 52 of the main unit casing 12 is appropriately cooled to suppress thermal deformation, thereby suppressing the deformation amount and the displacement amount of the external shroud 35, and ensuring an appropriate clearance between the rotor blades 34 and the external shroud 35. Furthermore, compressed air circulated in the cooling passages 53 passes through the discharge passage 55 and is discharged from the gap S to the combustion gas passage A to return compressed air bled by the compressor 14 to the combustion gas passage A as a cooling medium, thereby preventing a decrease in the turbine efficiency. Further, by using compressed air from the compressor 14 as the cooling medium, a pump or the like is not required separately, and the structure can be simplified.

In the aircraft gas turbine according to the first embodiment, one end of the cooling passage 53 is open to the suction part 54 of compressed air in the combustor 15. Accordingly, only the cooling passage 53 with one end thereof being open to the suction part 54 of compressed air in the combustor 15 needs to be provided in the thick wall part 52 of the main unit casing 12, thereby simplifying the structure without requiring a pump or another passage.

In the aircraft gas turbine according to the first embodiment, the external shroud 35 is provided inside of the main unit casing 12. The discharge passage 55 is provided between the main unit casing 12 and the external shroud 35, the other end of the cooling passage 53 is open to the discharge passage 55, and the discharge passage 55 is in communication with the combustion gas passage A via the gap S between the external shroud bodies 37 and 38. Accordingly, it is only necessary to provide the cooling passages 53 with the other end thereof being open to the discharge passage 55 in the thick wall part 52 of the main unit casing 12 and to ensure the gap S in the external shroud 35, thereby enabling discharge of compressed air circulated in the cooling passages 53 to the combustion gas passage A, and simplifying the structure without requiring a pump or the like. The thermal deformation amount and the displacement amount of the external shroud 35 are suppressed by cooling the thick wall part 52, and an appropriate clearance can be ensured between the external shroud 35 and the tips of the rotor blades 34.

In the aircraft gas turbine according to the first embodiment, compressed air circulated in the cooling passages 53 is discharged to the upstream side of the nozzle 44 in the combustion gas passage A through the discharge passage 55. Accordingly, compressed air discharged from the discharge passage 55 is returned to the upstream side of the nozzle 44 and is rectified by the nozzle 44, and thus the turbine 16 can increase the workload by the returned compressed air and a decrease in the turbine efficiency can be prevented.

In the aircraft gas turbine according to the first embodiment, the cooling passages 53 are provided along the axial direction of the rotor shafts 27 and 28 in the thick wall part 52 of the main unit casing 12, and are arranged in plural at an equal interval in the circumferential direction. Accordingly, the thick wall part 52 can be uniformly cooled in the circumferential direction by arranging the cooling passages 53 in the thick wall part 52 of the main unit casing 12 in the circumferential direction at an equal interval. Consequently, the temperature distribution in the circumferential direction of the main unit casing 12 is equalized to suppress the thermal deformation, and the clearance between the external shroud 35 and the tips of the rotor blades 34 can be uniformly maintained in the circumferential direction.

Second Embodiment

Figure 4:
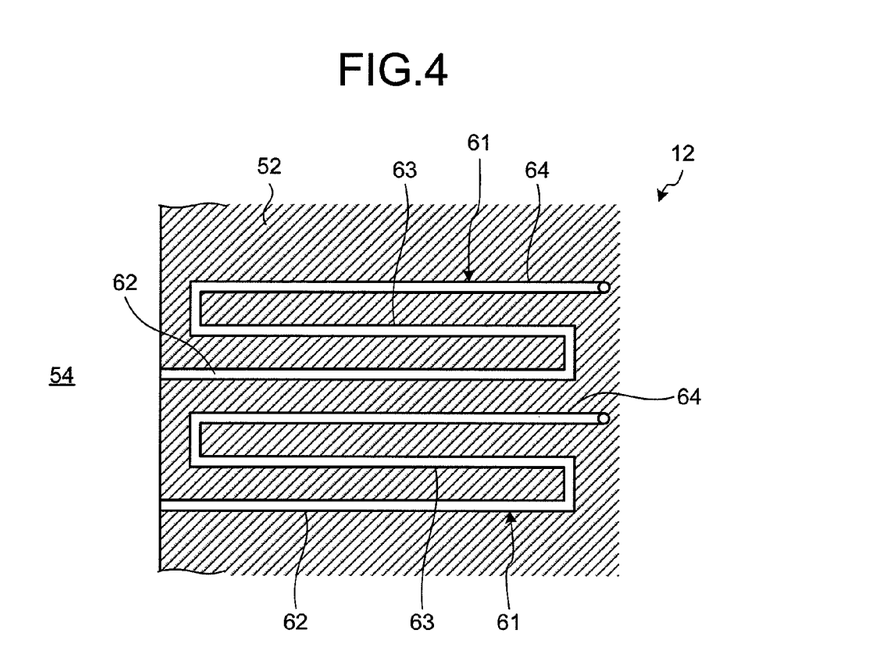
FIG. 4 is a schematic diagram of a thick wall part of a casing in an aircraft gas turbine according to a second embodiment of the present invention.

FIG. 4 is a schematic diagram of a thick wall part of a casing in an aircraft gas turbine according to a second embodiment of the present invention. Elements having functions identical to those explained in the above embodiment are denoted by like reference signs and redundant explanations thereof will be omitted.

In the aircraft gas turbine according to the second embodiment, as shown in FIG. 4, the main unit casing 12 has a containment structure with the thick wall part being reinforced by providing the thick wall part 52 corresponding to the outer periphery side of the rotor blade. A plurality of cooling passages 61 for cooling the thick wall part 52 by circulating compressed air compressed by the compressor are provided in the thick wall part 52. The cooling passages 61 are formed in a serpentine shape.

That is, one cooling passage 61 includes three paths of an inlet passage 62 with one end thereof being open to the suction part 54, an outlet passage 64 with one end thereof being open to the discharge passage, and a return passage 63 with one end thereof being in communication with the other end of the inlet passage 62 and the other end thereof being in communication with the other end of the outlet passage 64. The cooling passage 61 formed in a serpentine shape is not limited to a configuration of three paths, and it can be of two paths or four or more paths. While it is desired that the inlet passage 62, the return passage 63, and the outlet passage 64 adjacent to each other are arranged at an equal interval in a circumferential direction of the main unit casing 12, it is not essential to have an equal interval between them.

Accordingly, when compressed air compressed by the compressor is supplied to the suction part 54, compressed air flows in from the inlet passage 62 of each of the cooling passages 61. Compressed air flowing in from the inlet passage 62 flows in the return passage 63, and is discharged from the outlet passage 64 to the discharge passage. Because compressed air flows in each of the cooling passages 61, the thick wall part 52 is cooled. Therefore, the structural strength of the thick wall part 52 in the main unit casing 12 is improved, and the containment structure functions efficiently. The temperature difference between the thick wall part and the thin wall part of the main unit casing 12 having a relatively small thermal capacity is reduced by cooling the thick wall part 52 having a relatively large thermal capacity. Accordingly, the thermal stress of the main unit casing 12 and the thermal deformation amount of the thick wall part are suppressed, and the clearance between the tips of the rotor blades 34 and the external shroud can be maintained in an appropriate amount.

As described above, in the aircraft gas turbine according to the second embodiment, the cooling passages 61 for cooling the thick wall part by circulating compressed air compressed by the compressor are provided in the thick wall part 52 of the main unit casing 12, and the cooling passages 61 is formed in a serpentine shape.

Accordingly, compressed air compressed by the compressor 14 circulates in the respective cooling passages 61 formed in a serpentine shape, to enlarge a contact area between compressed air and the thick wall part 52, and thus the thick wall part 52 of the main unit casing 12 is efficiently cooled, to suppress the deformation amount and the displacement amount of the main unit casing 12 and the external shroud 35, thereby ensuring an appropriate clearance between the rotor blades 34 and the external shroud 35. Furthermore, it can be suppressed that a pressure loss in the cooling passages 61 increases and circulation of cooling air becomes excessive, by forming the cooling passages 61 in a serpentine shape, thereby improving the efficiency of the gas turbine by reducing the amount of cooling air.

Third Embodiment

Figure 5:
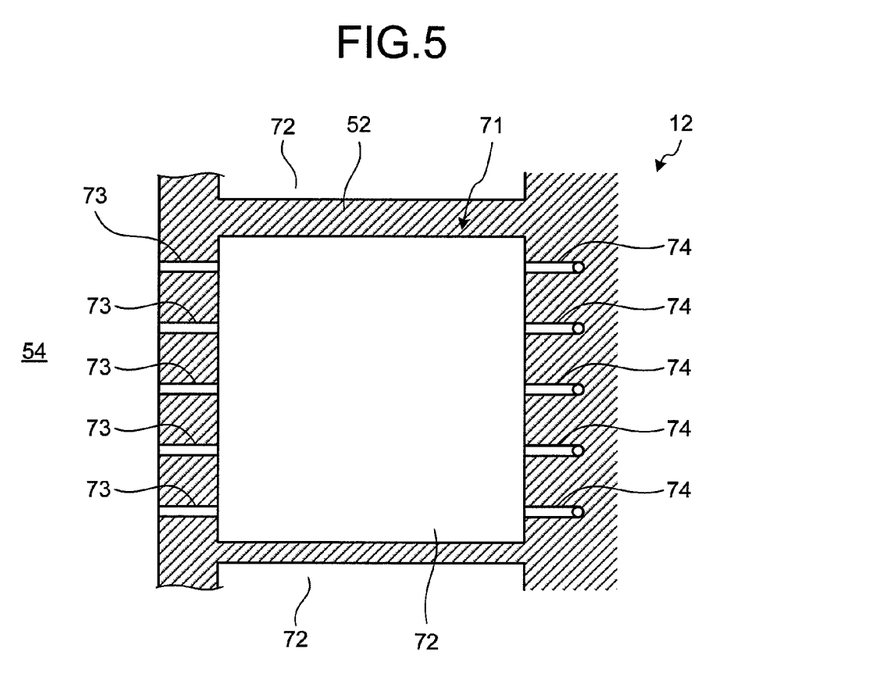
FIG. 5 is a schematic diagram of a thick wall part of a casing in an aircraft gas turbine according to a third embodiment of the present invention.

FIG. 5 is a schematic diagram of a thick wall part of a casing in an aircraft gas turbine according to a third embodiment of the present invention. Elements having functions identical to those explained in the above embodiments are denoted by like reference signs and redundant explanations thereof will be omitted.

In the aircraft gas turbine according to the third embodiment, as shown in FIG. 5, the main unit casing 12 has a containment structure with the thick wall part being reinforced by providing the thick wall part 52 corresponding to the outer periphery side of the rotor blade. A plurality of cooling passages 71 for cooling the thick wall part 52 by circulating compressed air compressed by the compressor are provided in the thick wall part 52.

The cooling passage 71 includes a cavity 72 for ensuring a predetermined space in the thick wall part 52, a plurality of inlet passages 73 with one end thereof being open to the suction part 54, and the other end thereof being in communication with the cavity 72, and a plurality of outlet passages 74 with one end thereof being in communication with the cavity 72 and the other end thereof being open to the discharge passage. As shown in FIG. 5, a plurality of cavities 72 can be divided and arranged in the circumferential direction of the main unit casing 12. Alternatively, one cavity 72 can be formed over the whole circumference. The inlet passage and the outlet passage 74 can be a circular hole, a polygonal hole in cross section, or formed in a slit shape.

Accordingly, when compressed air compressed by the compressor is supplied to the suction part 54, the compressed air flows in from the respective inlet passages in the cooling passage 71. Compressed air flowing in from the respective inlet passages 73 is accumulated in the cavity 72, and discharged from the respective outlet passages 74 to the discharge passage. Particularly, because compressed air flows into the cavity 72, the thick wall part 52 is cooled. Furthermore, because compressed air is accumulated in the cavity 72 and the cavity 72 functions as a radiation shield, it can be suppressed that the heat from the combustion gas is transmitted to an external wall of the thick wall part 52. Therefore, the structural strength of the thick wall part 52 in the main unit casing 12 is improved, and the containment structure functions efficiently. Further, the temperature difference between the thick wall part and the thin wall part of the main unit casing 12 having a relatively small thermal capacity is reduced by cooling the thick wall part 52 having a relatively large thermal capacity. Accordingly, the thermal stress and the thermal deformation amount of the main unit casing 12 are suppressed, and the clearance between the tips of the rotor blades 34 and the external shroud can be maintained in an appropriate amount.

In the aircraft gas turbine according to the third embodiment, the cooling passage 71 for cooling the thick wall part by circulating compressed air compressed by the compressor is provided in the thick wall part 52 in the main unit casing 12, and as the cooling passage 71, the cavity 72, the inlet passages 73, and the outlet passages 74 are provided.

Accordingly, when compressed air compressed by the compressor 14 enters into the respective cooling passages 71, compressed air is temporarily accumulated in the cavity 72, to increase a contact area between compressed air and the thick wall part 52, and the deformation amount and the displacement amount of the main unit casing 12 and the external shroud 35 are suppressed by efficiently cooling the thick wall part 52 of the main unit casing 12, thereby ensuring an appropriate clearance between the rotor blades 34 and the external shroud 35. Because the cavity 72 functions as the radiation shield, heat transfer to the external wall of the main unit casing 12 can be suppressed.

In the respective embodiments described above, the thick wall parts 51 and 52 are provided so as to correspond to the respective rotor blades 33 and 34, and the cooling passages 53, 61, and 71 are provided only in the one thick wall part 52. However, the cooling passage can be also provided in the thick wall part 51.

Furthermore, in the respective embodiments, compressed air in the discharge passage 55 is discharged to the upstream side of the nozzle 44. However, the discharge position is not limited thereto, and the discharge position can be on an upstream side of the nozzle 43, an upstream side of the respective rotor blades 33 and 34, or a downstream side of the rotor blade 34, so long as it is a position where the combustion gas does not flow back into the discharge passage 55 due to a pressure difference between the discharge passage 55 and the combustion gas passage A. In this case, the discharge passage 55 and the combustion gas passage A are communicated with each other via the gap S between the external shroud bodies 37 and 38. However, the discharge passage 55 and the combustion gas passage A can be communicated with each other via a gap between the external shroud bodies 38 and 39, or can be communicated with each other by forming another opening separately.

In the respective embodiments described above, one ends of the cooling passages 53, 61, and 71 are open to the suction part 54 of the combustor 15. However, in the structure in which the combustor 15 is arranged at a different position, compressed air can be supplied to the one ends of the cooling passages 53, 61, and 71 via another passage or a pipe.

When the cooling passages 53, 61, and 71 are formed in the thick wall part 52 of the main unit casing 12, shapes of the rotor blades 33 and 34, the external shroud 35, and the main unit casing 12 are designed according to the cooling efficiency by the cooling passages 53, 61, and 71 and the amount of heat from the combustion gas. Meanwhile, the shapes of the cooling passages 53, 61, and 71 can be set according to the shape of the turbine 16 or the amount of heat from the combustion gas.

The aircraft gas turbine according to the present invention is not limited to a turbofan type having the structure shown in FIG. 1, and can be also applied to a turbojet type, a turboprop type and the like.

In the aircraft gas turbine according to the present invention, a cooling passage for circulating compressed air to a thick wall part of a casing to cool the thick wall part is provided, and compressed air having being cooled is discharged to a combustion gas passage through a discharge passage. With this configuration, the aircraft gas turbine according to the present invention ensures the structural strength of the thick wall part by appropriately cooling the thick wall part of the casing, while simplifying the structure and preventing a decrease in efficiency, thereby ensuring effective containment performance and an appropriate clearance between the thick wall part and the rotor blade, and the aircraft gas turbine according to the present invention can be also applied to aircraft gas turbines of any type.

REFERENCE SIGNS LIST 11 fan casing (casing)
12 main unit casing (casing)
13 fan
14 compressor
15 combustor
16 turbine
23 low-pressure compressor
24 high-pressure compressor
25 high-pressure turbine
26 low-pressure turbine
33, 34 rotor blade
35 external shroud (casing)
36 internal shroud (casing)
43, 44 nozzle
51, 52 thick wall part
53, 61, 71 cooling passage
54 suction part
55 discharge passage
72 cavity
73 inlet passage
74 outlet passage

The invention claimed is:

1. An aircraft gas turbine comprising:
a casing constituting an outermost shell in a cylindrical shape to accommodate a compressor, a combustor, and a turbine therein, and including a wall part provided on an outer periphery side of a rotor blade of the turbine;
a shroud disposed radially inside the wall part of the casing so as to form an empty space between the shroud and the wall part of the casing;
a cooling passage provided in the wall part to circulate compressed air compressed by the compressor to cool the wall part; and
a discharge passage for discharging compressed air having circulated in the cooling passage to a combustion gas passage,
wherein the cooling passage includes an inlet passage with an inlet passage first end being open to a suction part of the combustor, an outlet passage with an outlet passage second end being open to the discharge passage, and a return passage with a return passage first end being in communication with an inlet passage second end, and a return passage second end being in communication with an outlet passage first end,
the inlet passage, the return passage, and the outlet passage being separately disposed so as to align in a circumferential direction of the casing at an equal interval such that the cooling passage forms a serpentine shape along the circumferential direction,
the cooling passage is formed in the wall part of the casing,
the empty space formed between the shroud and the wall part of the casing is the discharge passage for discharging compressed air having circulated in the cooling passage to the combustion gas passage,
the discharge passage is in communication with the combustion gas passage via an opening formed in the shroud, and
the discharge passage discharges compressed air having circulated in the cooling passage to an upstream side of a nozzle in the combustion gas passage via the opening formed in the shroud.

2. The aircraft gas turbine according to claim 1, wherein the cooling passage is provided in the wall part of the casing along an axis direction of a turbine rotor, and is arranged in plural in a circumferential direction at an equal interval.

* * * * *